US012581083B2

(12) United States Patent
Wang et al.

(10) Patent No.: US 12,581,083 B2
(45) Date of Patent: Mar. 17, 2026

(54) METHOD, DEVICE, AND COMPUTER PROGRAM PRODUCT FOR COMPRESSING TWO-DIMENSIONAL IMAGE

(71) Applicant: Dell Products L.P., Round Rock, TX (US)

(72) Inventors: Zijia Wang, London (GB); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 18/443,679

(22) Filed: Feb. 16, 2024

(65) Prior Publication Data

US 2025/0247540 A1 Jul. 31, 2025

(30) Foreign Application Priority Data

Jan. 25, 2024 (CN) .......................... 202410110870.8

(51) Int. Cl.
| | |
|---|---|
| *H04N 19/132* | (2014.01) |
| *G06T 17/00* | (2006.01) |
| *H04N 19/119* | (2014.01) |
| *H04N 19/176* | (2014.01) |
| *H04N 19/42* | (2014.01) |

(52) U.S. Cl.
CPC ........... *H04N 19/132* (2014.11); *G06T 17/00* (2013.01); *H04N 19/119* (2014.11); *H04N 19/176* (2014.11); *H04N 19/42* (2014.11)

(58) Field of Classification Search
CPC .... G06T 17/00; H04N 19/132; H04N 19/119; H04N 19/176; H04N 19/42; H04N 19/597
See application file for complete search history.

(56) References Cited

U.S. PATENT DOCUMENTS

| | | | |
|---|---|---|---|
| 2022/0108478 A1* | 4/2022 | Houlsby ................. | G06N 3/08 |
| 2023/0388502 A1* | 11/2023 | Besenbruch ........... | H04N 19/91 |
| 2024/0212263 A1* | 6/2024 | Lee ...................... | G06V 10/761 |

OTHER PUBLICATIONS

R. Hartley et al., "Multiple View Geometry in Computer Vision," Cambridge University Press, Second Edition, Mar. 2004, 673 pages.

(Continued)

*Primary Examiner* — Kee M Tung
*Assistant Examiner* — Thang Gia Huynh
(74) *Attorney, Agent, or Firm* — Ryan, Mason & Lewis, LLP

(57) ABSTRACT

The present disclosure relates to a method, a device, and a computer program product for compressing a two-dimensional image. The method includes determining a plurality of importance scores of a plurality of images by a trained image compressor network according to pixel values of the plurality of images. The method further includes selecting an image subset from the plurality of images according to the plurality of importance scores of the plurality of images. In addition, the method further includes compressing the plurality of images by retaining the selected image subset and abandoning the remaining images. In this way, high image reconstruction quality is maintained while a high compression ratio is achieved. Moreover, as a manual labeling or calibration process is avoided, a large-scale data set can be processed with less manual intervention and fewer computing resources.

20 Claims, 5 Drawing Sheets

(56)                    References Cited

OTHER PUBLICATIONS

N. Snavely et al., "Photo Tourism: Exploring Photo Collections in 3D," ACM Transactions on Graphics, vol. 25, No. 3, pp. 835-846.

S. M. Seitz et al., "A Comparison and Evaluation of Multi-View Stereo Reconstruction Algorithms," IEEE Computer Society Conference on Computer Vision and Pattern Recognition (CVPR'06), Jun. 2006, 8 pages.

C. B. Choy et al., "3D-R2N2: A Unied Approach for Single and Multi-view 3D Object Reconstruction," arXiv:1604.00449v1, Apr. 2, 2016, 17 pages.

H. Fan et al., "A Point Set Generation Network for 3D Object Reconstruction from a Single Image," IEEE Conference on Computer Vision and Pattern Recognition (CVPR), Jul. 2017, pp. 605-613.

N. Wang et al., "Pixel2Mesh: Generating 3D Mesh Models from Single RGB Images," Proceedings of the European Conference on Computer Vision (ECCV), Oct. 6, 2018, 16 pages.

J. J. Park et al., "DeepSDF: Learning Continuous Signed Distance Functions for Shape Representation," IEEE/CVF Conference on Computer Vision and Pattern Recognition (CVPR), Jun. 2019, pp. 165-174.

B. Mildenhall et al., "NeRF: Representing Scenes as Neural Radiance Fields for View Synthesis," European Conference on Computer Vision, Aug. 2020, 17 pages.

K. Park et al., "Nerfies: Deformable Neural Radiance Fields," IEEE/CVF International Conference on Computer Vision, arXiv:2011.12948v5, Sep. 10, 2021, 18 pages.

R. Martin-Brualla et al., "NeRF in the Wild: Neural Radiance Fields for Unconstrained Photo Collections," IEEE/CVF Conference on Computer Vision and Pattern Recognition (CVPR), Jun. 2021, pp. 7210-7219.

P. Kellnhofer et al., "Neural Lumigraph Rendering," arXiv:2103.11571v1, Mar. 22, 2021, 17 pages.

M. Niemeyer et al., "GIRAFFE: Representing Scenes as Compositional Generative Neural Feature Fields," IEEE/CVF Conference on Computer Vision and Pattern Recognition (CVPR), Jun. 2021, pp. 11453-11464.

A. Vaswani et al., "Attention Is All You Need," arXiv:1706.03762v5, 31st Conference on Neural Information Processing Systems, Dec. 6, 2017, 15 pages.

J. Devlin et al., "BERT: Pre-training of Deep Bidirectional Transformers for Language Understanding," arXiv:1810.04805v2, May 24, 2019, 16 pages.

A. Dosovitskiy et al., "An Image is Worth 16×16 Words Transformers for Image Recognition at Scale," The International Conference on Learning Representations, arXiv:2010.11929v2, Jun. 3, 2021, 22 pages.

L. Dong et al., "Speech-transformer: A No-recurrence Sequence-to-sequence Model for Speech Recognition," 2018 IEEE International Conference on Acoustics, Speech and Signal Processing, Apr. 2018, 5 pages.

H. Zhao et al., "Point Transformer," Proceedings of the IEEE/CVF International Conference on Computer Vision (ICCV), Oct. 2021, pp. 16259-16268.

G. Yang et al., "PointFlow: 3D Point Cloud Generation with Continuous Normalizing Flows," 2019 IEEE/CVF International Conference on Computer Vision (ICCV), Oct. 2019, pp. 4541-4550.

R. Li et al., "SGTR: End-to-end Scene Graph Generation with Transformer," IEEE/CVF Conference on Computer Vision and Pattern Recognition (CVPR), Jun. 2022, pp. 19486-19496.

K.-E. Lin et al., "Vision Transformer for NeRF-Based View Synthesis from a Single Input Image," Proceedings of the IEEE/CVF Winter Conference on Applications of Computer Vision (WACV), Jan. 2023, pp. 806-815.

Z. Wang et al., "NeRF--: Neural Radiance Fields Without Known Camera Parameters," arXiv:2102.07064v4, Apr. 6, 2022, 17 pages.

S. M. Lundberg et al., "A Unified Approach to Interpreting Model Predictions," arXiv:1705.07874v2, Nov. 25, 2017, 10 pages.

P. Hedman et al., "Baking Neural Radiance Fields for Real-Time View Synthesis," arXiv:2103.14645v1, Mar. 26, 2021, 15 pages.

* cited by examiner

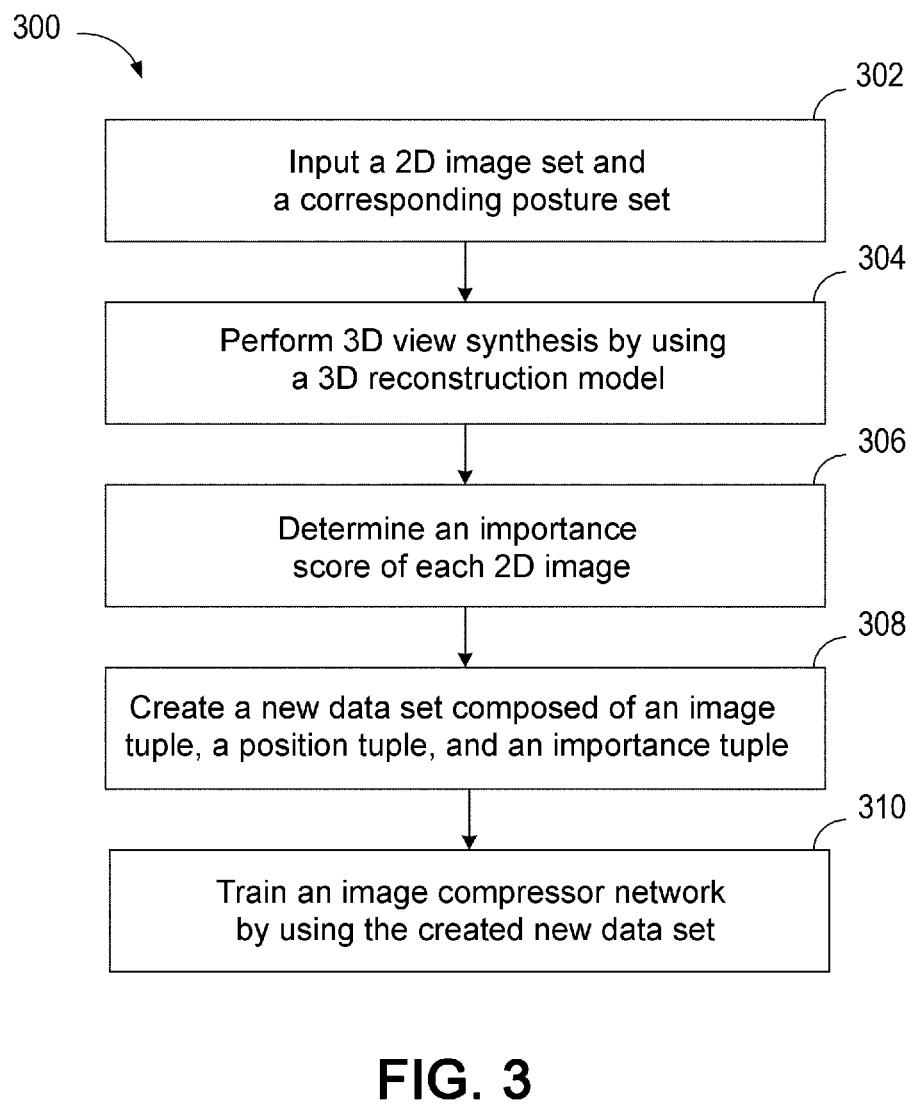

300

302

Input a 2D image set and
a corresponding posture set

304

Perform 3D view synthesis by using
a 3D reconstruction model

306

Determine an importance
score of each 2D image

308

Create a new data set composed of an image
tuple, a position tuple, and an importance tuple

310

Train an image compressor network
by using the created new data set

FIG. 3

METHOD, DEVICE, AND COMPUTER PROGRAM PRODUCT FOR COMPRESSING TWO-DIMENSIONAL IMAGE

RELATED APPLICATION

The present application claims priority to Chinese Patent Application No. 202410110870.8, filed Jan. 25, 2024, and entitled "Method, Device, and Computer Program Product for Compressing Two-Dimensional Image," which is incorporated by reference herein in its entirety.

FIELD

The present disclosure relates to the field of data compression, and more specifically, to a method, a device, and a computer program product for compressing a two-dimensional image.

BACKGROUND

A large quantity of two-dimensional (2D) images are needed as an input in many application scenes of computer vision. However, storage and processing of such a large quantity of data may be high in cost and low in efficiency. In the related art, in order to save storage resources and improve processing speed, an inputted image is usually compressed at the expense of quality of an outputted image.

Recently, some neural networks (for example, transformer networks) are applied to a three-dimensional (3D) vision task, such as point cloud classification, shape generation, or scene completion. The transformer network is a powerful sequence modeling architecture, which captures long-term dependence relying on a self-attention mechanism.

SUMMARY

Embodiments of the present disclosure provide a method, a device, and a computer program product for compressing a 2D image.

According to a first aspect of an embodiment of the present disclosure, a method for compressing an image is provided and includes: determining a plurality of importance scores of a plurality of images by a trained image compressor network according to pixel values of the plurality of images; selecting an image subset from the plurality of images according to the plurality of importance scores of the plurality of images; and compressing the plurality of images by retaining the selected image subset and abandoning the remaining images.

According to a second aspect of an embodiment of the present disclosure, an electronic device is provided and includes: at least one processor; and a memory coupled to the at least one processor and having instructions stored therein, wherein the instructions, when executed by the at least one processor, cause the electronic device to perform actions including: determining a plurality of importance scores of a plurality of images by a trained image compressor network according to pixel values of the plurality of images; selecting an image subset from the plurality of images according to the plurality of importance scores of the plurality of images; and compressing the plurality of images by retaining the selected image subset and abandoning the remaining images.

According to a third aspect of an embodiment of the present disclosure, a computer program product is provided, the computer program product being tangibly stored on a non-transitory computer-readable medium and including machine-executable instructions, wherein the machine-executable instructions, when executed by a machine, cause the machine to perform actions including: determining a plurality of importance scores of a plurality of images by a trained image compressor network according to pixel values of the plurality of images; selecting an image subset from the plurality of images according to the plurality of importance scores of the plurality of images; and compressing the plurality of images by retaining the selected image subset and abandoning the remaining images.

It is to be understood that the content described in this Summary is neither intended to limit key or essential features of embodiments of the present disclosure, nor intended to limit the scope of the present disclosure. Other features of the present disclosure will become readily understood from additional description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, the same or similar reference numerals always represent the same or similar elements. In the accompanying drawings:

FIG. 3 shows a flowchart of a method for training an image compressor network according to some embodiments of the present disclosure;

DETAILED DESCRIPTION

Figure 1:
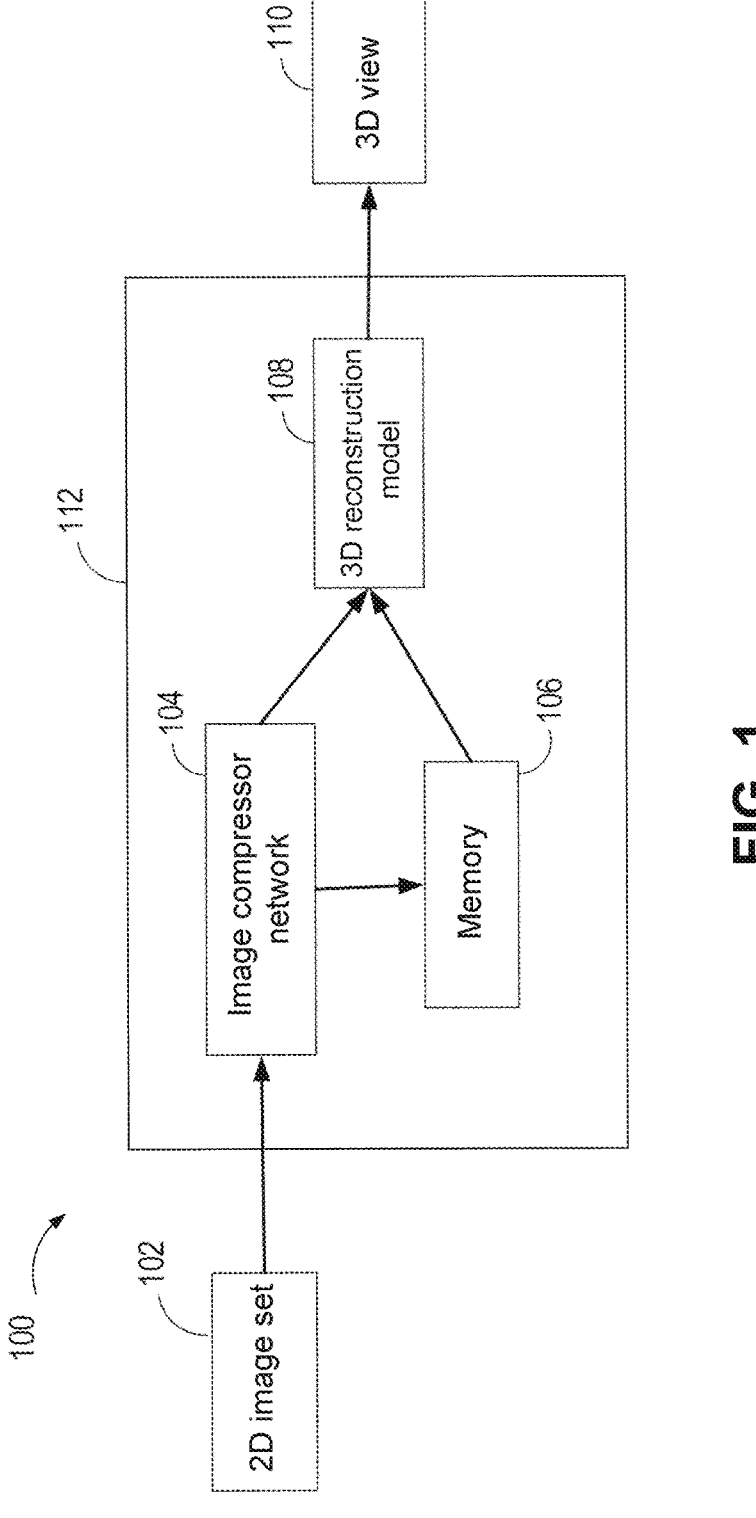
FIG. 1 shows a schematic diagram of an overall design for implementing 3D view synthesis by using an image compressor network according to some embodiments of the present disclosure.

Illustrative embodiments of the present disclosure will be described below in further detail with reference to the accompanying drawings. Although the accompanying drawings show some embodiments of the present disclosure, it is to be understood that the present disclosure may be implemented in various forms, and is not to be construed as being limited to the embodiments stated herein. Rather, these embodiments are provided for understanding the present disclosure more thoroughly and completely. It is to be understood that the accompanying drawings and embodiments of the present disclosure are for illustrative purposes only, and are not intended to limit the scope of protection of the present disclosure.

In the description of embodiments of the present disclosure, the terms "include," "have," and similar terms thereof are to be understood as open-ended inclusion, that is, "including but not limited to." The term "based on" is to be understood as "based at least in part on." The terms "embodiment," "one embodiment," or "this embodiment" are to be understood as "at least one embodiment."

Image compression is applied to many scenes in diverse applications, for example, applied to reconstruction of 2D to 3D images. This type of reconstruction usually needs a large quantity of 2D images as an input, however, storage and processing of such a large quantity of data may be high in cost and low in efficiency. A 3D representation is usually learned from 2D images using methods such as voxel, point cloud, meshes, or implicit functions, but when these methods are used for processing more challenging scenes and generalized to invisible objects, an obtained reconstructed image usually has problems of low resolution, aliasing artifacts, lack of fine details, or the like.

In order to efficiently and highly accurately complete a 2D to 3D image reconstruction task, storage space and computing resources required by 2D to 3D image reconstruction need to be reduced, and meanwhile, the quality and accuracy of an outputted image need to be maintained. This problem may be expressed in the following manner. A 2D image set is given, where each image in the image set is an image of the same object or scene in different viewing angles, and an image subset and a camera posture set corresponding thereto need to be found, so that a size of the subset is far less than that of the 2D image set, while the quality of a 3D image reconstructed according to the subset and the camera posture set corresponding thereto is equivalent to the quality of a 3D image reconstructed from the 2D image set and a camera posture set corresponding thereto, and the accuracy of a new view obtained from synthesis may also be comparable to the accuracy obtained from the 2D image set and the camera posture set corresponding thereto.

This problem is challenging for a number of reasons. First, the quantity of possible subsets of images is in an exponential relationship with the quantity of inputted images, which may make it difficult to find an optimal subset through a computing mode. Second, the quality and accuracy of 3D reconstruction and new view synthesis depend on a content and geometric structure of an image, and thus a simple heuristic method (such as selecting an image with the highest diversity or representativeness) may have poor effect. Finally, a 3D reconstruction model may be a black box function, and the contribution of each image to 3D reconstruction and how to measure its importance are difficult to analyze.

In order to address these and other challenges, the present disclosure provides a new framework, which performs content-aware lossless compression of a 2D image by using an image compressor network based on a transformer network. In an embodiment of the present disclosure, importance scores of images are determined by using a trained image compressor network, the images are retained or abandoned according to the importance scores of the images, and thus compression of an image set is implemented. By using this solution, high image reconstruction quality is also maintained while a high compression ratio is achieved. Moreover, as a manual labeling or calibration process is avoided, a large-scale data set can be processed with less manual intervention and fewer computing resources.

FIG. 1 shows a schematic diagram of environment 100 of synthesizing 3D view 110 by using image compressor network 104 according to some embodiments of the present disclosure. As shown in FIG. 1, environment 100 includes computing device 112, and computing device 112 includes image compressor network 104, memory 106, and 3D reconstruction model 108. Image compressor network 104 may be a trained compressor network obtained after training, which comprises an encoder and a decoder. Image compressor network 104 according to an embodiment of the present disclosure may be applied to implementing various tasks, and the present disclosure does not limit the structure thereof and a specific task implemented thereby.

Computing device 112 may include, but is not limited to, a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge computing device, a distributed computing environment including any of the above systems or devices, etc.

In some embodiments, as shown in FIG. 1, 2D image set 102 is inputted into image compressor network 104 in computing device 112. In general, 2D image set 102 includes several two-dimensional images of the same object or scene captured from different viewing angles. Image compressor network 104 predicts an importance score and position of each 2D image according to a pixel value of 2D image set 102, then an image subset with a high importance score is selected, and the remaining images are abandoned.

A process in which image compressor network 104 predicts the importance score and position of 2D image set 102 will be described in detail elsewhere herein.

By way of introduction of such a process, inputted 2D image set 102 is first processed by the encoder of image compressor network 104, and the encoder is a vision transformer, which divides each image in 2D image set 102 into a plurality of pixel blocks and transforms these pixel blocks to marked sequences. The marked sequences are then fed into a stack of encoder layers including one or more layers that use self-attention and feedforward operations for encoding a global feature and a local feature of each image. Finally, the encoded marked sequences are outputted, where each image corresponds to one encoded marked sequence.

The encoded marked sequences are inputted into the decoder, and the decoder is also a transformer, which uses a masked self-attention and cross-attention mechanism for decoding the features from the encoder and generates an importance score and position for each 2D image. Through the above-mentioned mode, estimating a position and an importance score of an image by using a geometric technique (e.g., stereo matching, a motion structure, or multiple view stereo) is avoided, so that learning may be performed in a case in which only an image is given, and thus extension to a more challenging and invisible object or scene may be allowed.

In some embodiments, the image subset with a high importance score selected by image compressor network 104 as well as the corresponding importance score and position are used as data needed by 3D reconstruction model 108 and stored in memory 106, so as to be read from memory 106 when 3D reconstruction needs to be performed.

In some embodiments, the image subset with the high importance score selected by image compressor network 104 as well as the corresponding importance score and position are used as data needed by 3D reconstruction model 108 and directly transmitted into 3D reconstruction model 108.

3D reconstruction model 108 performs 3D reconstruction on the 2D image subset by using training data obtained through image compressor network 104. 3D view 110 with high quality of an object or scene is finally outputted by continuously training and evaluating 3D reconstruction model 108.

An example of 3D reconstruction model 108 includes but is not limited to a neural radiance field (NeRF) reconstruction model. The NeRF reconstruction model is a type of new 3D scene representation method, which may only need an image and a posture to learn a scene, and models a 3D scene as a continuous function of 3D coordinates and an observation direction. A group of positioning images of a scene is given, the NeRF model learns a multilayer perceptron (MLP) network, a 3D coordinate and the observation direction are used as an input, and a color and a density at this point are outputted. A new view of the scene is synthesized with high fidelity and consistency by sampling and accumulating a color and density along each camera sight line.

Compared with a conventional method of implementing compression at the expense of quality of an outputted image, the method of the present disclosure, through the mode described with reference to FIG. 1, achieves a high compression ratio and maintains high image reconstruction quality. Furthermore, compared with a conventional method needing manual labeling, calibration, or optimization, the method of the present disclosure can efficiently process a large-scale data set with less manual intervention and fewer computing resources. In addition, trained image compressor network 104 can perform prediction with the need of only an image, so the method of the present disclosure is more suitable for challenging and invisible objects or scenes.

Figure 2:
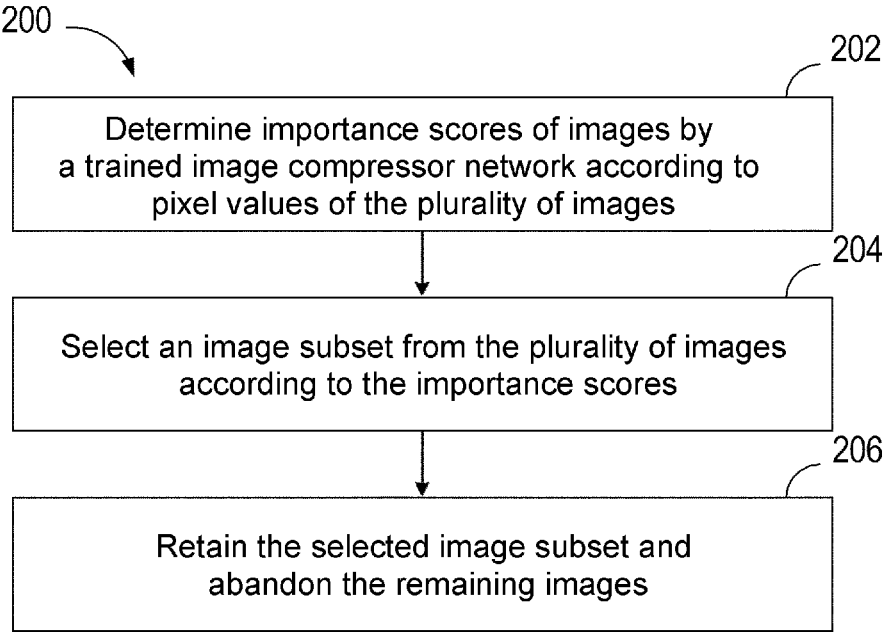
FIG. 2 shows a flowchart of a method for compressing an image set according to some embodiments of the present disclosure.

A method 200 for compressing 2D image set 102 according to an embodiment of the present disclosure is described below with reference to FIG. 2. FIG. 2 shows a flowchart of the method 200 for compressing 2D image set 102 according to some embodiments of the present disclosure. The method 200 may be executed at computing device 112 in FIG. 1 or any suitable computing device. In addition, reference numerals in the flowchart do not represent a sequential order of executing these steps, and some or all of these steps may be executed in parallel, or executing orders may be interchanged, which is not limited in the present disclosure.

At block 202, an importance score of each 2D image may be given by a trained image compressor network according to pixel values of a plurality of images. In some embodiments, in an encoder of trained image compressor network 104, pixels of each image are divided into a plurality of pixel blocks, these pixel blocks are transformed to marked sequences, then these marked sequences are encoded and inputted into a decoder of trained image compressor network 104, the decoder decodes the marked sequences coming from the encoder, and then the importance score for each 2D image is generated.

In block 204, the trained image compressor network selects an image subset with a high importance score according to the importance score of each image. In some embodiments, an importance score threshold may be set, and images with the importance scores being higher than the threshold are selected for constituting the image subset with the high importance score.

In block 206, the trained image compressor network retains the selected image subset and abandons the remaining images. In some embodiments, the retained image subset will be used as input data of 3D reconstruction model 108 for synthesizing 3D view 110. Through the above mode, trained image compressor network 104 implements compressing of the plurality of 2D images, saves storage resources and computing resources, and meanwhile, maintains the quality and accuracy of image reconstruction.

A method 300 for training image compressor network 104 according to an embodiment of the present disclosure is described below with reference to FIG. 3. FIG. 3 shows a flowchart of the method 300 for training image compressor network 104 according to some embodiments of the present disclosure. The method 300 may be executed at computing device 112 in FIG. 1 or any suitable computing device. In addition, reference numerals in the flowchart do not represent a sequential order of executing these steps, and some or all of these steps may be executed in parallel, or executing orders may be interchanged, which is not limited in the present disclosure.

At block 302, 2D image set I={I$_1$, I$_2$, . . . , I$_N$} from the same object or scene and a posture set P={P$_1$, P$_2$, . . . , P$_N$} corresponding thereto are inputted into 3D reconstruction model 108, and in this embodiment, an NeRF reconstruction model is adopted. N represents the quantity of images in 2D image set 102. In general, the posture set P may be read by COLMAP software. A posture is illustratively a six-dimensional vector, including a position (x, y, z) and an observation direction d of a camera for shooting an image.

At block 304, 3D reconstruction model 108 uses image set I and posture set P for learning multilayer perceptron (MLP) network F$_\theta$. MLP network F$_\theta$ can map the position and observation direction of the camera to a color c and a density $\sigma$, so as to synthesize a new view of the object or the scene by using the color and the density.

In some embodiments, in a case in which posture set P is given, 3D reconstruction model 108 samples N$_r$ points along each camera sight line r, and the camera sight line passes through a center of the camera and pixels of an image plane. Positions and observation directions of the N$_r$ points are fed into F$_\theta$, so that c$_i$ and $\sigma_i$, i=1, 2, . . . N$_r$ are obtained. Colors ĉ(r) along sight line r are mixed by using $\alpha$ synthesis, which is expressed as $$\hat{c}(r) = \sum_{i=1}^{N_r} T_i \alpha_i c_i \qquad (1)$$

where T$_i$ is expressed as $$T_i = \exp\left(-\sum_{j=1}^{i-1} \sigma_j \Delta_j\right) \qquad (2)$$

which represents a transmittance accumulated along sight line r to point i, and $\alpha_i$ is expressed as $$\alpha_i = 1 - \exp(-\sigma_i \Delta_i) \qquad (3)$$

which is an $\alpha$ value at point i, and $\Delta_i$ is a distance between point i and point i+1. Loss of view synthesis may be determined by using a difference between a synthesized color ĉ(r) and a true color. This loss is minimized through a gradient descent method, so that 3D reconstruction model 108 is optimized.

Figure 4:
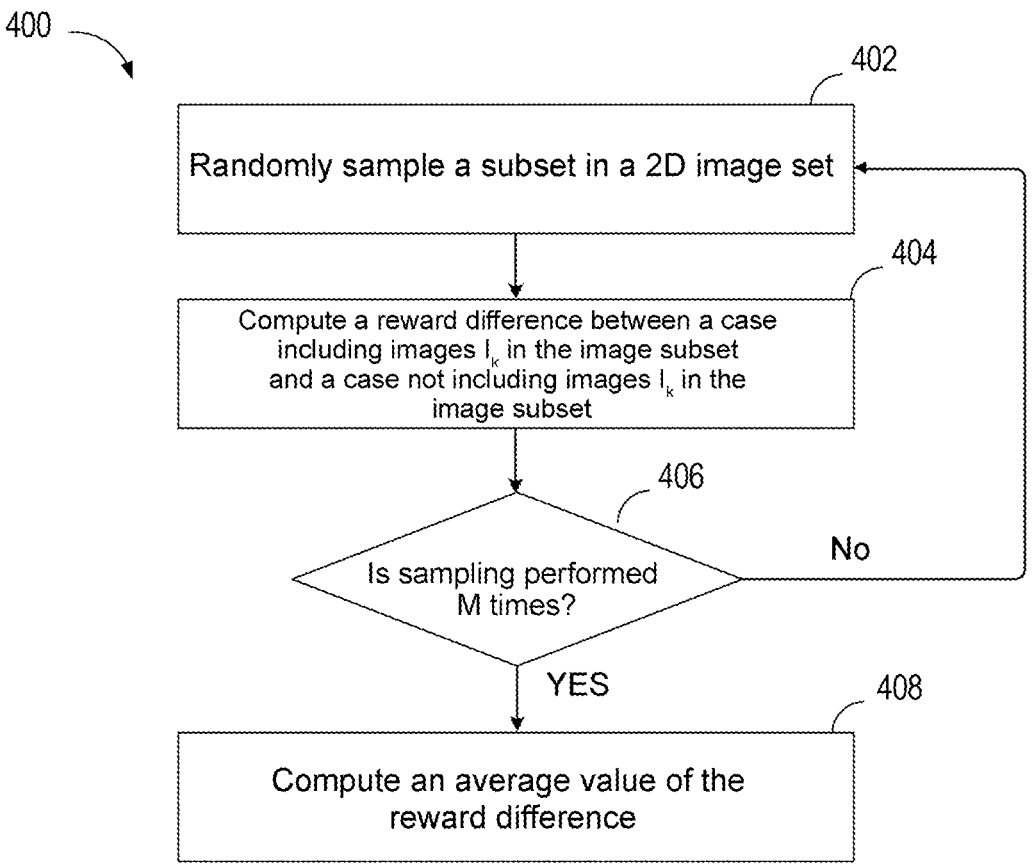
FIG. 4 shows a flowchart of a method for determining importance scores of a 2D image set according to some embodiments of the present disclosure.

At block 306, the importance score of each 2D image is determined. A method 400 for determining the importance score of 2D image set 102 according to an embodiment of the present disclosure is described below with reference to FIG. 4. FIG. 4 shows a flowchart of the method 400 for determining an importance score of 2D image set 102 according to some embodiments of the present disclosure. The method 400 may be executed at computing device 112 in FIG. 1 or any suitable computing device.

In the present disclosure, method 400 may also be called a SHAP-like method. As SHAP is a framework for interpreting a machine learning model by distributing feature importance scores based on Shapley values, it is a game theory concept for quantifying contribution of each player to a cooperative play, while in the solution of the present disclosure, each image is regarded as a player, and 3D reconstruction model 108 is regarded as a game. In order to evaluate contribution of each image to 3D reconstruction model 108, a reward of the game is defined with negative L2 loss between the new view synthesized through 3D reconstruction model 108 and a true new view, so a Shapley value of each image is defined as $$\phi_k = \sum_{S \subseteq J \setminus 1_k} \frac{|S|! \, (|J|-|S|-1)!}{|J|!} (f(S \cup I_k) - f(S)) \qquad (4)$$

where f(S) is a reward function returned when a subset S of images and postures corresponding thereto are used for training and evaluating 3D reconstruction model 108, and $f(S \cup I_k)$ is a reward function returned when a union set of the subset S of the images and images $I_k$ as well as postures corresponding thereto are used for training and evaluating 3D reconstruction model 108. Shapley value $\phi_k$ represents an average contribution margin to the reward when images $I_k$ are added to any image subset.

However, calculating an accurate Shapley value requires evaluation of the reward function for all possible image subsets, so the calculation is time-consuming and expensive. In order to avoid calculating all the possible image subsets, the present disclosure uses an approximation method based on sampling. The method includes randomly sampling a subset from 2D image set 102 (step 402), then calculating a reward difference between a case in which images $I_k$ are added to randomly sampled image subset $S_m$ and a case in which only image subset $S_m$ is present (step 404), then judging whether the above sampling and calculating process is performed M times (step 406), returning to step 402 if the above sampling and calculating process is not performed the $M^{th}$ time, and calculating the average of calculating results if the above sampling and calculating process is performed M times (step 408) to obtain an estimation value of $\phi_k$, the estimation value $\hat{\phi}_k$ being expressed as $$\hat{\phi}_k = \frac{1}{M} \sum m = 1^M (f(S_m \cup I_k) - f(S_m)) \qquad (5)$$

The estimation value $\hat{\phi}_k$ is used as the importance score of the images $I_k$, each importance score is normalized by calculating a sum of all the importance scores, and thus a probability distribution of the 2D image set may be obtained. An image that is the most informative for describing content and a geometric shape of the scene may be selected according to performing results by using the method 400 shown in FIG. 4.

Returning to FIG. 3, at block 308, a new data set comprising an image tuple, a position tuple, and an importance tuple is created. In the new data set, data in the image tuple and the position tuple directly originates from the inputted image set and posture set, and only the importance score in the importance tuple is obtained indirectly through method 400.

In some embodiments, an objective of including the importance score in the new data set is to train image compressor network 104, so the inference time for the new image set may no longer need the method 400 shown in FIG. 4, and the importance score of the image may be directly inferred.

In some embodiments, an objective of including a position of a camera and the images in the new data set is to train image compressor network 104, so during the inference time for the new image set, the position of the camera may be estimated only according to pixel values of the images, so as to be used as input data of 3D reconstruction model 108.

At block 310, the created new data set is used for training image compressor network 104. Different from the NeRF reconstruction model with the need of given camera position and images, image compressor network 104 can predict the camera position corresponding to an image only with the need of using the pixel value of the image as an input. In order to train image compressor network 104, a total loss function is defined for evaluating the accuracy of its prediction. The total loss function $\mathcal{L}$ total is a weighted sum of a position loss function $\mathcal{L}$ pos and an importance loss function $\mathcal{L}$ imp, which is expressed as $$\mathcal{L}total = \lambda_1 \mathcal{L}pos + \lambda_2 \mathcal{L}imp \qquad (6)$$

where $\lambda_1$ and $\lambda_2$ are weight factors corresponding to $\mathcal{L}$ pos and $\mathcal{L}$ imp respectively, and a sum thereof is less than or equal to 1. $\mathcal{L}$ pos is expressed as $$\mathcal{L}pos = \frac{1}{N} \sum k = 1^N |\hat{P}_k - P_k|_2^2 \qquad (7)$$

where $\hat{P}_k$ is a prediction value of the camera position predicted by image compressor network 104 for images $I_k$, and $P_k$ is a true value of the camera position from the new data set for images $I_k$. $\mathcal{L}$ imp is expressed as $$\mathcal{L}imp = -\frac{1}{N} \sum k = 1^N \phi_k \log(\hat{\phi}_k) \qquad (8)$$

where $\hat{\phi}_k$ is the importance score predicted by image compressor network 104 for images $I_k$, and $\phi_k$ is the importance score from the new data set for images $I_k$. The total loss function is minimized by using the gradient descent method, so that optimization of image compressor network 104 is implemented.

In some embodiments, when 3D view 110 is synthesized by using trained image compressor network 104, only 2D image set 102 may be inputted without including the camera position corresponding to 2D image set 102, as trained image compressor network 104 may directly predict the camera position, and in addition, trained image compressor network 104 may also directly predict the importance score for each 2D image without performing the method 400 shown in FIG. 4. In this way, an inference speed may be improved, and meanwhile, learning is performed only from the pixel values of the images without depending on the accurate camera posture or geometric hypothesis, which may then be extended to objects or scenes with different shapes, textures, illumination conditions, and viewing angles as well as invisible objects or scenes.

Figure 5:
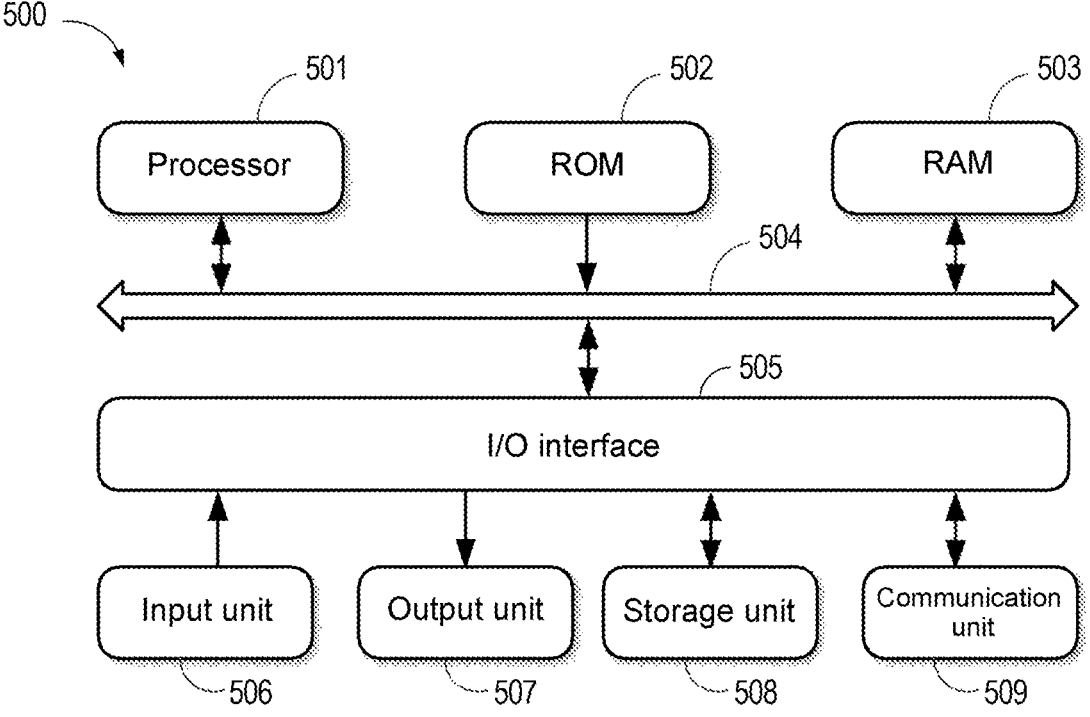
FIG. 5 is a block diagram of an example device suitable for implementing embodiments of the present disclosure.

FIG. 5 is a block diagram of example device 500 that can be used for implementing embodiments of the present disclosure. As shown in the figure, device 500 includes processor 501, which may execute various appropriate actions and processing in accordance with computer program instructions stored in read-only memory (ROM) 502 or computer program instructions loaded from storage unit 508 onto random access memory (RAM) 503. Various programs and data required for the operation of device 500 may further be stored in RAM 503. Processor 501, ROM 502, and RAM 503 are connected to one another through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processor 501 may be various general-purpose and/or special-purpose processing components with processing and computing capabilities. Some examples of processor 501 include, but are not limited to, a central processing unit (CPU), a graphics processing unit (GPU), various specialized artificial intelligence (AI) computing chips, various processors for running machine learning model algorithms, a digital signal processor (DSP), and any appropriate processor, controller, microcontroller, and the like. Processor 501 performs various methods and processing described above, such as method 200, method 300 and/or method 400. For example, in some embodiments, method 200, method 300 and/or method 400 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded onto RAM 503 and executed by processor 501, one or more steps of method 200, method 300 and/or method 400 described above may be performed. Alternatively, in other embodiments, processor 501 may be configured to perform method 200, method 300 and/or method 400 by any other suitable techniques (e.g., by means of firmware).

The functions described herein may be performed at least in part by one or more hardware logic components. For example, without limitation, example types of available hardware logic components include: a field programmable gate array (FPGA), an application specific integrated circuit (ASIC), an application specific standard product (ASSP), a system on chip (SOC), a complex programmable logic device (CPLD), and the like.

Program codes for implementing the method of the present disclosure may be written by using one programming language or any combination of a plurality of programming languages. These program codes may be provided for a processor or controller of a general purpose computer, a special purpose computer, or another programmable data processing apparatus, such that the program codes, when executed by the processor or controller, implement the functions/operations specified in the flowcharts and/or block diagrams. The program codes may be executed completely on a machine, executed partially on a machine, executed partially on a machine and partially on a remote machine as a stand-alone software package, or executed completely on a remote machine or server.

In the context of the present disclosure, the machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the above content. Additionally, although operations are depicted in a particular order, this is not to be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these are not to be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a terminology specific to structural features and/or method logical actions, it is to be understood that the subject matter defined in the appended claims is not necessarily limited to the particular features or actions described above. Rather, the particular features and actions described above are merely example forms of implementing the claims.

What is claimed is:

1. A method for compressing an image, comprising:
   determining a plurality of importance scores of a plurality of images by a trained image compressor network according to pixel values of the plurality of images, wherein the trained image compressor network comprises an encoder and a decoder, with an output of the encoder being coupled to an input of the decoder, the encoder being configured to encode multiple distinct portions of each of the images into a corresponding encoded sequence for that image, the decoder being configured to process the encoded sequences for the respective images to generate the importance scores of the images;
   selecting an image subset from the plurality of images according to the plurality of importance scores of the plurality of images; and
   compressing the plurality of images by retaining the selected image subset and abandoning the remaining images.

2. The method according to claim 1, wherein the retained image subset is used for reconstructing a three-dimensional (3D) scene.

3. The method according to claim 1, wherein determining the plurality of importance scores of the plurality of images comprises causing the encoder of the trained image compressor network to perform the following steps:

dividing each image of the plurality of images into a plurality of pixel blocks;

transforming the plurality of pixel blocks to marked sequences;

feeding the marked sequences to a stack of encoder layers including one or more layers that use self-attention and feedforward operations for encoding a global feature and a local feature of each image; and outputting encoded marked sequences, wherein each image corresponds to one encoded marked sequence.

4. The method according to claim 3, wherein determining the plurality of importance scores of the plurality of images further comprises causing the decoder of the trained image compressor network to perform the following steps:

using the encoded marked sequences as an input;

decoding the features from the encoder by using a masked self-attention and cross-attention mechanism; and generating a set comprising the importance score of each image.

5. The method according to claim 1, further comprising: performing three-dimensional (3D) reconstruction and synthesizing on a two-dimensional (2D) image set of a 3D scene and a posture set corresponding to the 2D image set by using a 3D reconstruction model, to obtain a new 3D view.

6. The method according to claim 5, further comprising: determining the importance score of each image based on a contribution of each image in the 2D image set to the 3D reconstruction.

7. The method according to claim 6, wherein determining the importance score of each image comprises:

randomly sampling a subset in the 2D image set;

determining a reward difference between a case in which an image in the 2D image set is added to the subset and a case in which the image is not added to the subset;

repeating the sampling and the determining of the reward difference one or more times; and calculating the average of obtained results to obtain an estimation value of the importance score of the image.

8. The method according to claim 1, further comprising: creating a new data set comprising an image tuple, a position tuple, and an importance tuple.

9. The method according to claim 8, further comprising: training the image compressor network by using the created new data set.

10. The method according to claim 9, wherein training the image compressor network comprises:

minimizing a total loss function by using a gradient descent method;

wherein the total loss function is a weighted sum of a position loss function and an importance loss function;

wherein the position loss function is determined based on a quantity of images, a true value of a camera position, and an estimation value for the camera position obtained by the image compressor network; and wherein the importance loss function is determined based on the quantity of images, the estimation value of the importance score, and an estimation value for the importance score of the image obtained by the image compressor network.

11. An electronic device, comprising:

at least one processor; and memory coupled to the at least one processor and having instructions stored therein, wherein the instructions, when executed by the at least one processor, cause the electronic device to perform actions comprising:

determining a plurality of importance scores of a plurality of images by a trained image compressor network according to pixel values of the plurality of images, wherein the trained image compressor network comprises an encoder and a decoder, with an output of the encoder being coupled to an input of the decoder, the encoder being configured to encode multiple distinct portions of each of the images into a corresponding encoded sequence for that image, the decoder being configured to process the encoded sequences for the respective images to generate the importance scores of the images;

selecting an image subset from the plurality of images according to the plurality of importance scores of the plurality of images; and compressing the plurality of images by retaining the selected image subset and abandoning the remaining images.

12. The electronic device according to claim 11, wherein the retained image subset is used for reconstructing a three-dimensional (3D) scene.

13. The electronic device according to claim 11, wherein determining the plurality of importance scores of the plurality of images comprises causing the encoder of the trained image compressor network to perform the following steps:

dividing each image of the plurality of images into a plurality of pixel blocks;

transforming the plurality of pixel blocks to marked sequences;

feeding the marked sequences to a stack of encoder layers including one or more layers that use self-attention and feedforward operations for encoding a global feature and a local feature of each image; and outputting encoded marked sequences, wherein each image corresponds to one encoded marked sequence.

14. The electronic device according to claim 13, wherein determining the plurality of importance scores of the plurality of images further comprises causing the decoder of the trained image compressor network to perform the following steps:

using the encoded marked sequences as an input;

decoding the features from the encoder by using a masked self-attention and cross-attention mechanism; and generating a set comprising the importance score of each image.

15. The electronic device according to claim 11, wherein the actions further comprise: performing three-dimensional (3D) reconstruction and synthesizing on a two-dimensional (2D) image set of a 3D scene and a posture set corresponding to the 2D image set by using a 3D reconstruction model, to obtain a new 3D view.

16. The electronic device according to claim 15, wherein the actions further comprise: determining the importance score of each image based on a contribution of each image in the 2D image set to 3D reconstruction.

17. The electronic device according to claim 16, wherein determining the importance score of each image comprises:

randomly sampling a subset in the 2D image set;

determining a reward difference between a case in which an image in the 2D image set is added to the subset and a case in which the image is not added to the subset;

repeating the sampling and the determining of the reward difference one or more times; and calculating the average of obtained results to obtain an estimation value of the importance score of the image.

18. The electronic device according to claim 11, wherein the actions further comprise: creating a new data set comprising an image tuple, a position tuple, and an importance tuple.

19. The electronic device according to claim 18, wherein the actions further comprise: training the image compressor network by using the created new data set.

20. A computer program product comprising a non-transitory computer-readable medium having machine-executable instructions stored therein, wherein the machine-executable instructions, when executed by a machine, cause the machine to perform actions comprising:

determining a plurality of importance scores of a plurality of images by a trained image compressor network according to pixel values of the plurality of images, wherein the trained image compressor network comprises an encoder and a decoder, with an output of the encoder being coupled to an input of the decoder, the encoder being configured to encode multiple distinct portions of each of the images into a corresponding encoded sequence for that image, the decoder being configured to process the encoded sequences for the respective images to generate the importance scores of the images;

selecting an image subset from the plurality of images according to the plurality of importance scores of the plurality of images; and compressing the plurality of images by retaining the selected image subset and abandoning the remaining images.

\* \* \* \* \*